United States Patent [19]
Sawai et al.

[11] Patent Number: 5,606,483
[45] Date of Patent: Feb. 25, 1997

[54] WIRE PROTECTING APPARATUS FOR AUTOMOBILES

[75] Inventors: Mamoru Sawai; Kaoru Kurita; Tsuyoshi Nakamura; Yasuhiro Hara; Mitsugu Watanabe, all of Kosai, Japan

[73] Assignee: Yazaki Corporation, Tokyo, Japan

[21] Appl. No.: 359,627

[22] Filed: Dec. 20, 1994

[30] Foreign Application Priority Data

Dec. 28, 1993 [JP] Japan .................................. 5-337557

[51] Int. Cl.$^6$ ...................................................... H02H 5/04
[52] U.S. Cl. ........................... 361/106; 361/103; 361/115
[58] Field of Search .................................. 361/103, 106, 361/24, 25, 27, 115; 307/10.1

[56] References Cited

U.S. PATENT DOCUMENTS 5,072,327  12/1991  Knollman ............................... 361/106
5,264,766  11/1993  Tracht ..................................... 361/27

FOREIGN PATENT DOCUMENTS 61-188246  8/1986  Japan .................................. H02G 3/16

Primary Examiner—Jeffrey A. Gaffin
Assistant Examiner—Stephen Jackson
Attorney, Agent, or Firm—Armstrong, Westerman, Hattori, McLeland & Naughton

[57] ABSTRACT

A wire-protecting apparatus for automobiles in which at least one power-supplying lead for supplying an electric power to a load has at least one PTC element inserted in series with the power-supplying lead. The PTC element exhibits a high resistance at temperatures higher than a predetermined value when an overcurrent greater than a predetermined value flows through the load, thereby substantially shutting off the electric power to the load.

4 Claims, 6 Drawing Sheets

WIRE PROTECTING APPARATUS FOR AUTOMOBILES

BACKGROUND OF THE INVENTION

1. Field of the Invention

The present invention relates to a wire-protecting apparatus for use with automobiles that protects electrical components and electrical wirings used for cars.

2. Description of the Related Art

Conventionally, electrical components mounted at various locations of an automotive vehicle are connected to each other by the use of a junction box where a number of electrical and electronic components such as relays and fuses are collectively housed.

FIG. 12 shows a schematic diagram of a system disclosed in Japanese Laid-open Patent No. 61-188,246, which system protects electrical components and wires from overcurrent caused by troubles such as a short circuit. A lighting circuit a for lighting lamps L is provided with a fuse b and a potential difference detector c. The potential difference developed across a current detecting resistor d in the detector c is directed over a indicator circuit line e to an indicator f. Indicator lamp g is lighted up by the potential difference clearly indicating an abnormality such as a burning-out of a lamp. However, the system has a disadvantage in that once a fuse b blows out due to overcurrent, the system failure cannot be remedied the fuse b is replaced with a good one. Since the occurrence of overcurrent is displayed only after the fuse has blown out, problems cannot be detected before the fuse blows out.

FIG. 6 shows a prior art motor-driving circuit. The motor is in series with a fuse 13 which protects wires 12 when the motor circuit is short-circuited. The motor 14 is provided with a motor protecting element 15 which protects the motor 14 from burning out when the motor is locked.

FIG. 7 shows characteristic curves showing the relation between time and the current flowing through the circuit in FIG. 6. In FIG. 7, curve W represents the smoke characteristic of the wire 12, curve F the melting characteristic of the fuse 13, curve J the current waveform when the motor is looked. Curve T represents a time duration before the lock current is controlled by the motor protecting element 15. The wire protecting apparatus is designed so that the fuse 13 blows out before the wires begin to smoke. Thus, curve W does not cross curve F. The fuse is selected so that curve J crosses curve F. In this manner, the fuse 13 and motor protecting element 15 have different tasks. This indicates that the circuit needs two wire-protecting means which impose deficiencies such as large space required, large size of components, and more weight.

FIG. 11 shows a conventional door control relay circuit having a wire-protecting circuit based on a fuse 17 and a circuit breaker 18. There are also shown a door lock motor 19 and a relay unit 20.

During start-up of the motor starts as well as when the motor is locked, a considerably large current compared with a rated current flows through the wire. In order to carry this large current, conductors and associated components in the system package must be of large capacity. This inevitably increases the size and weight of both the leads and associated components of the circuit, and the excessive heat due to a large current may possibly cause the printed circuit board to burn out.

SUMMARY OF THE INVENTION

The present invention was made in view of the problems as described above. It is an object of the invention to provide a wire-protecting apparatus for use with automobiles which protects the wires from overcurrent without using fuses and enables detection of abnormal conditions in the automobiles. The present invention has PTC elements which are placed in series with leads supplying electric power to components mounted on the oar body. Also, the wire protecting apparatus is preferably provided with means that displays an occurrence of abnormal condition of a car by detecting an overcurrent flowing through the PTC element. Further, the PTC elements are preferably connected to leads which in turn are connected to a motor.

In the present invention, PTC elements are used in place of prior art fuses made of a fusible substance. The resistance of a PTC element begins to quickly increase at temperatures above a certain value as shown in FIG. 2. This resistance-temperature characteristic permits the use of a PTC element in place of a fuse to detect and to oppose an overcurrent in the circuit, thereby protecting the wires and components connected to the PTC element.

The initial value Uo of curve U of a PTC element may be set during manufacture. Curve U indicates that a PTC element has a voltage drop characteristic which eliminates the need of a conventional voltage adjustment by changing the length of the circuit leads. Thus, the PTC element is useful in reducing the length and weight of the wires in the wire-protecting apparatus, and may be used as a standardized component in most cars. A serial insertion of the PTC element into a circuit allows the circuit to be protected from overcurrent and overheating caused by the overcurrent. Assuming that a constant voltage is applied to the circuit shown in FIG. 3 and the load resistance $R_L$ of the circuit is higher than the resistance of the PTC element in the normal state, the heat-temperature characteristic of the PTC element is expressed by a curve such as $P_{G1}$ having a peak value:

$$P_{G1}=E^2R_L/(R_T+R_L)^2.$$

Also, the heat radiated from the element is proportional to the difference between the temperature of the element and the ambient temperature. Heat $P_D$ radiated from the PTC element is given by:

$$P_D=K(T-T_A)$$

where T is the temperature of the element, $T_A$ is the ambient temperature, K is a coefficient.

The element is said to be in an equilibrium state when the radiated heat $P_D$ is equal to the generated heat $P_{G1}$. Thus, the element is in an equilibrium condition at points (1) and (3) if the two curves $P_{G1}$ and $P_D$ cross each other at points (1), (2), and (3).

The PTC element normally stays in the equilibrium at point (1). An abnormal condition causes the PTC element to reach point (3) where the resistance of the element is higher, limiting the current flowing through the wire. The change in resistance of the PTC element from point (1) to point (3) is referred to as trip phenomenon. Once the element have entered the trip state, the circuit will not return to its normal condition even if the cause of the abnormality has been removed. To recover the circuit from the tripped condition, the supply voltage must be reduced to a value less than curve $P_{G2}$ or the power supply must be turned off till the PTC element has cooled down.

As shown in FIG. 2, the resistance of a PTC element slowly increases with temperature and begins to abruptly increase at a temperature, i.e., about 120 degrees Celsius in FIG. 2.

Thus, upon an overcurrent in a circuit due, for example, to a short-circuitting, the current through the PTC element generates heat, which abruptly raises the resistance of the PTC element to quickly reduce the current in the circuit, thus bringing the circuit into a state as if the power supplied to the circuit is almost turned off, protecting the wires and the electrical components.

Thus, the invention allows recovery of the circuit from abnormal conditions without having to change any protective components while the prior art fuse system requires replacement of fuses that have been blown out due to overcurrents. An operator may be promptly informed of an abnormal condition of the vehicle by a display means that detects the overcurrent through the PTC element to display such abnormal condition. For example, a circuit may be provided where a comparator detects a change in potential due to an overcurrent, and, for example, a lamp or alarm indicates an abnormal condition of the vehicle to the operator, so that the operator promptly switches off the circuit to allow the PTC element to cool down. The operator removes the cause of the abnormal condition and switches on the circuit to bring the circuit into normal operation again.

BRIEF DESCRIPTION OF THE DRAWINGS

These and other features and advantages of the invention will be better understood from a consideration of the following detailed description taken in conjunction with the accompanying drawings in which.

DETAILED DESCRIPTION OF THE PREFERRED EMBODIMENTS

Figure 1:
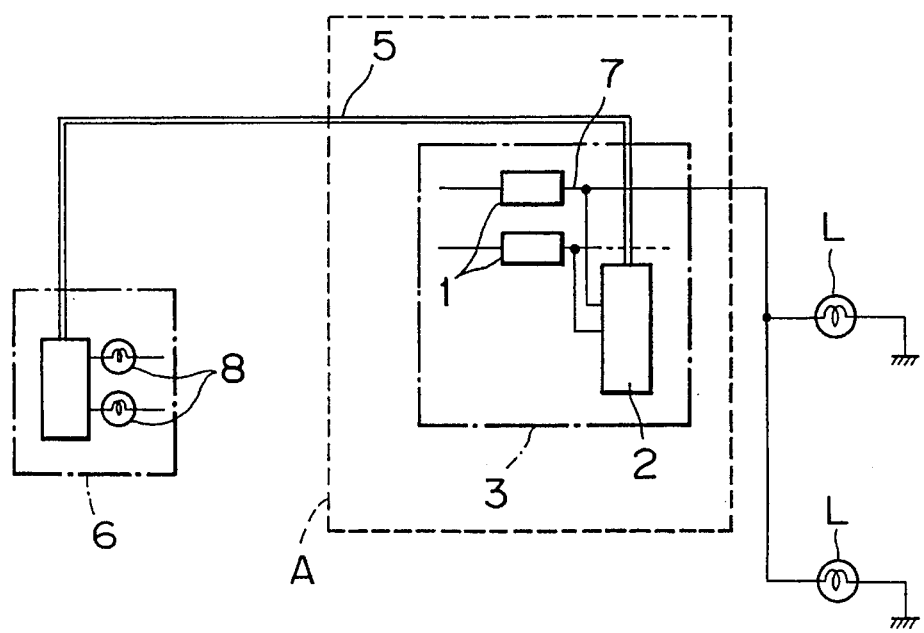
FIG. 1 is a illustrating diagram illustrating a first example of a circuit-protecting apparatus for automobiles according to the present invention.
Figure 4:
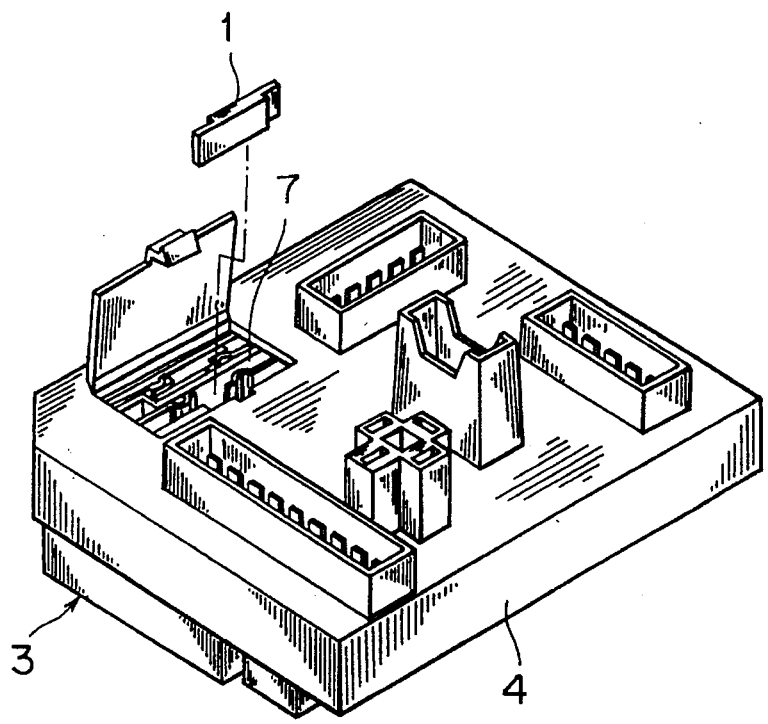
FIG. 4 is a perspective view illustrating how the PTC element of FIG. 1 is installed to a junction box.
Figure 7:
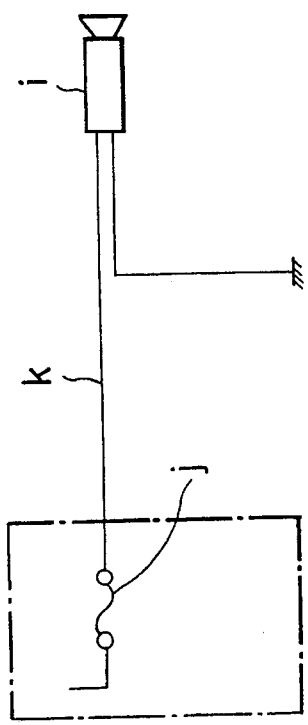
FIG. 7 is a graph of a characteristic curve showing the relation between time and a current of each component in the circuit of FIG. 5.
Figure 14:
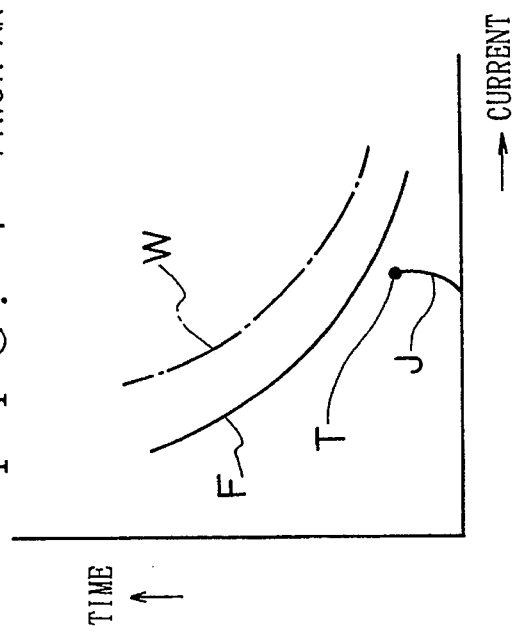
FIG. 14 is a schematic diagram of the cigarette lighter of FIG. 13.

FIG. 1 shows a first example of the invention where a wire-protecting apparatus A of the invention is used in a circuit for lighting lamps L of an automobile. The wire-protecting apparatus A for automobiles comprises a junction box 4 (FIG. 4) in which a unit 3 having a PTC element 1 and a comparator 2 is incorporated, and an indicator 6 connected to the unit 3 via multiple lines 5. FIG. 4 is a perspective view illustrating how the PTC element of FIG. 1 is installed in the junction box 4.

Figure 2:
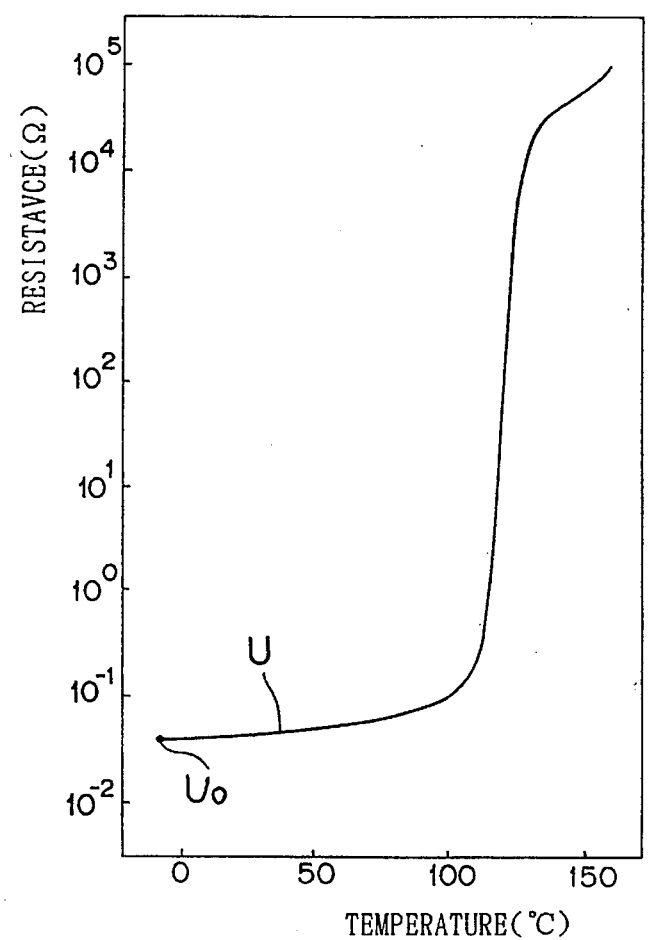
FIG. 2 is a graph showing a resistance-temperature characteristic of the PTC element of FIG. 1.
Figure 3:
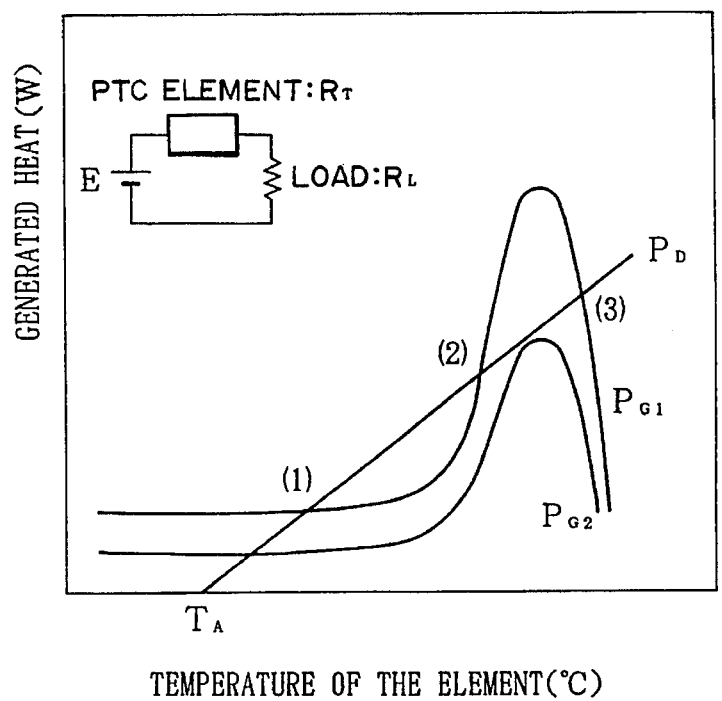
FIG. 3 is a graph showing a heat-temperature characteristic of the PTC element of Fi g. 1.

A PTC element 1 is an element which has a positive nonlinear temperature characteristic, such as curve U shown in FIG. 2 where the resistance increases quickly at temperatures of about 110 through 120 degrees Celsius. These temperatures can be set at will by properly selecting the material of the element. For example, the temperature is about 120 degrees Celsius for high density polyethylene such as a polymer, and about 180 degrees Celsius for polyvinylidenefluoride. Thus, substituting the prior art fuse in the junction box 4 for the PTC element 1 provides a wire-protecting apparatus that interrupts an overcurrent.

Specifically, the PTC element 1 serially connected to a lead 7 (e.g., a bus bar or conductor line) in the junction box 4 generates heat resulting in a rise in temperature of the PTC element when an overcurrent flows in the circuit for some reason or another. When the temperature of the PTC element rises to about 120 degrees Celsius, the resistance of the PTC element 1 increases abruptly as is seen from the characteristic curve of FIG. 2. The abrupt increase in resistance causes the current flowing through the circuit to drastically decrease as if the current is almost shut off. Therefore, the PTC element 1 connected in the circuit protects the circuit from overcurrent. The potential on the junction of the PTC element and the lamps L drastically drops when an overcurrent flows through the PTC element.

The potential at the junction of the PTC element and the load changes drastically when an abonormal condition such as a short-circuit occurs. A comparator 2 shown in FIG. 1 is a circuit for detecting when the potential difference caused by the change in current through the PTC element 1 has reached a predetermined value.

The circuit generates a signal for indicating the occurrence of abnormality in response to the overcurrent. The signal indicative of an abnormal condition is transmitted through multiple lines 5 to an indicator 6 provided on the meter panel to light a warning lamp 8 provided in the indicator 6 which displays occurrence of abnormality. The operator is informed of the occurrence of an abnormal condition by the warning lamp and then removes the cause of abnormality. In the meantime, the PTC element 1 radiates heat to cool down to its normal state. Thus, the circuit recovers to its normal state without having to do anything to the protecting circuit in which the PTC element 1 is used.

Figure 5:
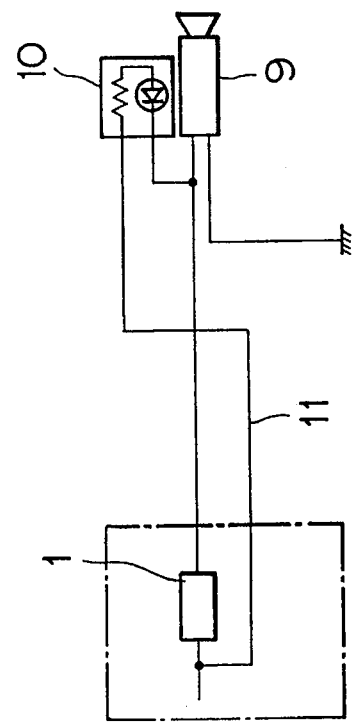
FIG. 5 is a schematic diagram showing a second example of the present invention.

FIG. 5 shows a second example of the invention where a wire-protecting apparatus of the invention is incorporated in a cigarette lighter of a car. As shown in FIG. 5, a conventional cigarette lighter circuit of a car has a cigarette lighter i at the dashpanel h as a power outlet for various car accessories. This can cause such problems as frequent blow out of fuses and burning out of the circuit lead k of the cigarette lighter circuit due to excessive current over the rated current drawn from the cigarette lighter. A wire-protecting apparatus for the cigarette lighter circuit may be constructed as shown in FIG. 5 where a PTC element is used in place of a conventional fuse and an abnormality-detecting lamp 10 such as an LED (Light-Emitting Diode) is provided as an indicator means near the cigarette lighter 9. The PTC element 1 is connected in parallel with the abnormality detecting lamp 10.

In FIG. 5, an overcurrent through the cigarette lighter 9 will raise the temperature of the PTC element 1. When the temperature approaches about 120 degrees Celsius, the resistance of the PTC element drastically increases to instantly interrupt the overcurrent. The increased resistance causes a current to flow through the lead 11 to light the abnormality detecting lamp 10 to indicate the occurrence of an abnormal condition to the operator. Then, the operator quickly pulls the car accessory out of the cigarette lighter 9 as soon as he recognizes the abnormality indication, thereby recovering the cigarette lighter circuit 9 to its normal state. The PTC element does not blow out like a fuse. This eliminates the need of replacing protecting parts such as a fuse, simplifying the recovery procedure.

Figure 8:
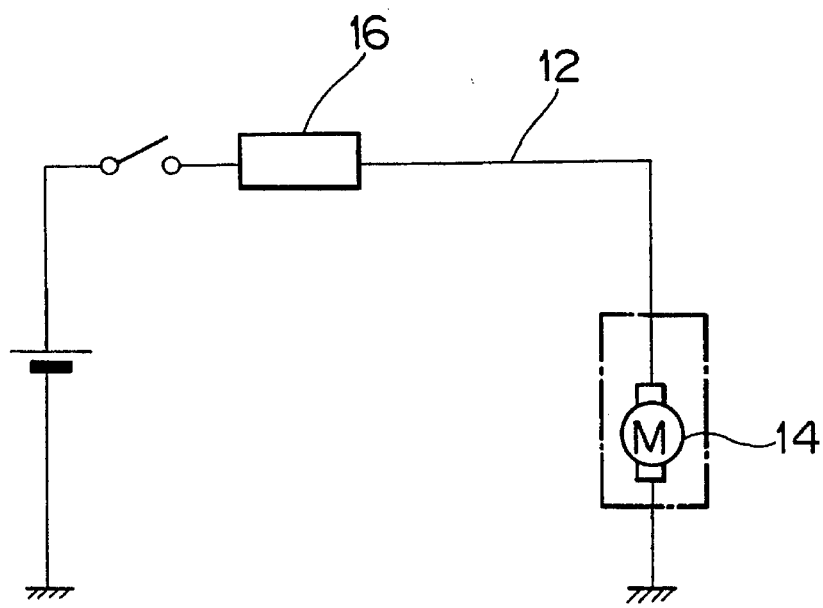
FIG. 8 is a schematic circuit diagram showing a third example wherein a wire-protecting apparatus for automobiles according to the invention is applied to a motor driving circuit.

FIG. 8 shows a third example of the invention where a wire protecting apparatus of the invention is applied to a motor driving circuit for driving a wiper motor and power window of an automobile.

Figure 6:
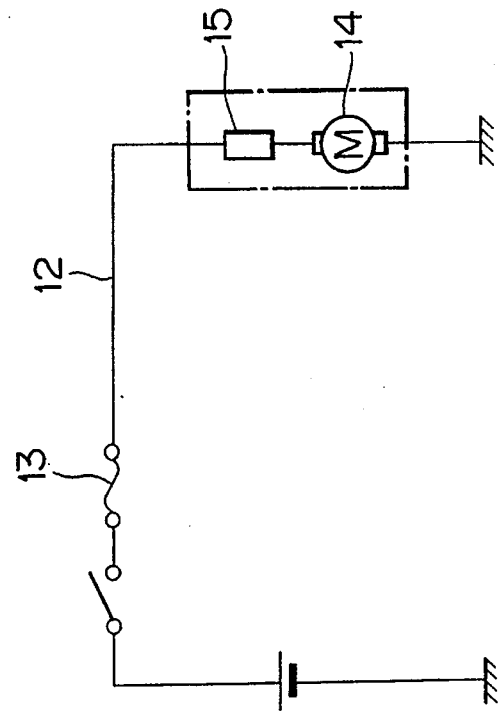
FIG. 6 is a schematic diagram showing a conventional motor-driving circuit.
Figure 9:
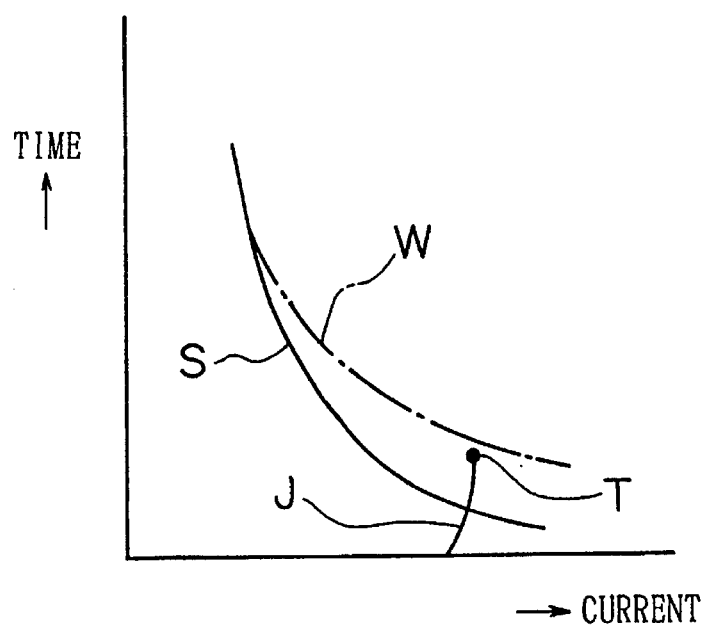
FIG. 9 is a diagram of a characteristic curve showing the relation between time and a current of each component in the circuit of FIG. 7.

The motor driving circuit in FIG. 8 overcomes the deficiencies with the prior art motor driving circuit in FIG. 6. In the figure, a wire protecting apparatus having a polymer PTC element 16 incorporated is used so that the prior art fuse 13 and motor protecting element 15 are eliminated. FIG. 9 shows a characteristic curve showing the relation between the current and time. In FIG. 9, curve W represents the smoke characteristic of the wire 12, curve S tripping characteristic of the polymer PTC element 16, curve J waveform where the motor is looked, and curve T time duration before the look current is control led by the PTC element. It is to be noted that the prior art fuse 13 blows out if curve J crosses curve F.

In the circuit of FIG. 6, the polymer PTC element 16 has a self-recovery feature, so that the resistance of the element 16 returns to its original value after the cause of the abnormal condition of the vehicle has been removed. This self-recovery feature prevents any problem with curve S crossing curve J. Designing the circuit so that curve S crosses curve J allows elimination of the motor protecting element 15, which limits the current drawn by the motor. Thus, the wire protecting apparatus simplifies the motor driving circuit and facilitates maintenance by virtue of the self recovery feature of a PTC element.

Figure 10:
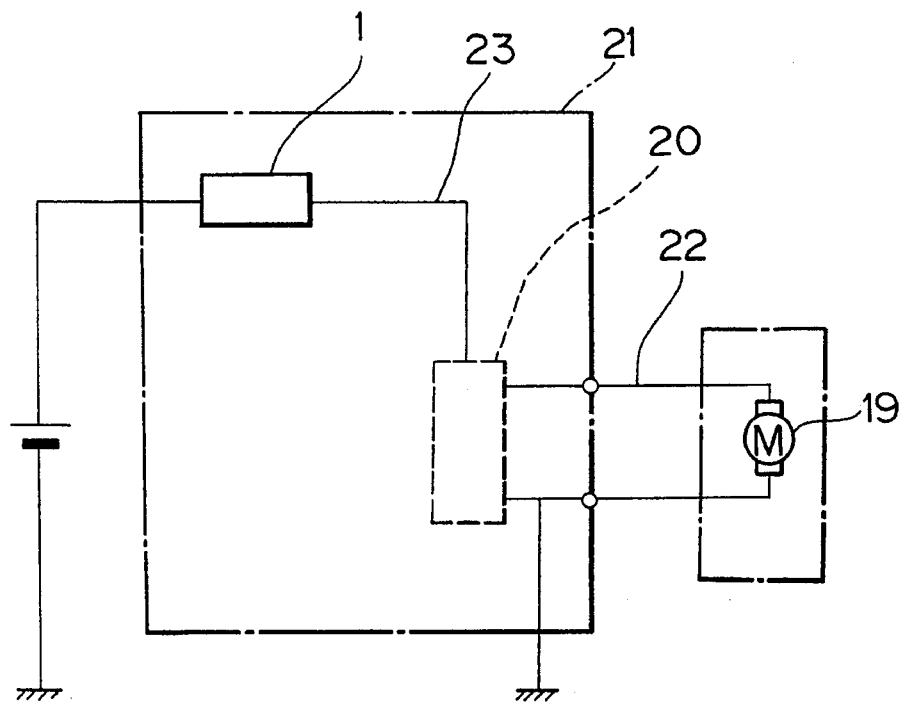
FIG. 10 is a schematic circuit diagram showing a fourth example of the invention.

FIG. 10 shows a fourth example in the form of a door controlling relay circuit for use with an automobile in which a wire protecting apparatus for automobiles is incorporated.

Figure 11:
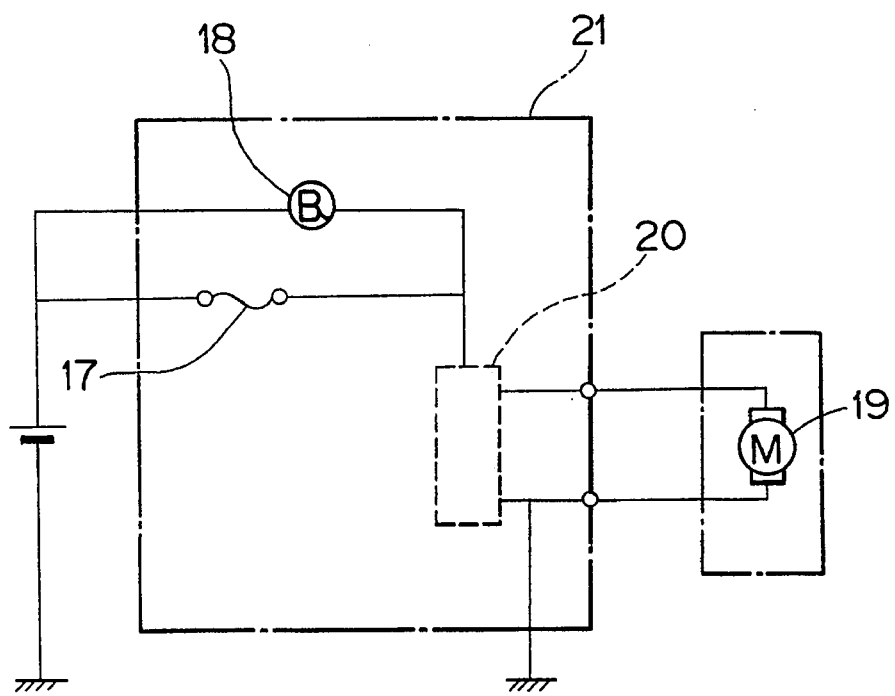
FIG. 11 is a schematic circuit diagram showing another prior art motor-driving circuit.
Figure 12:
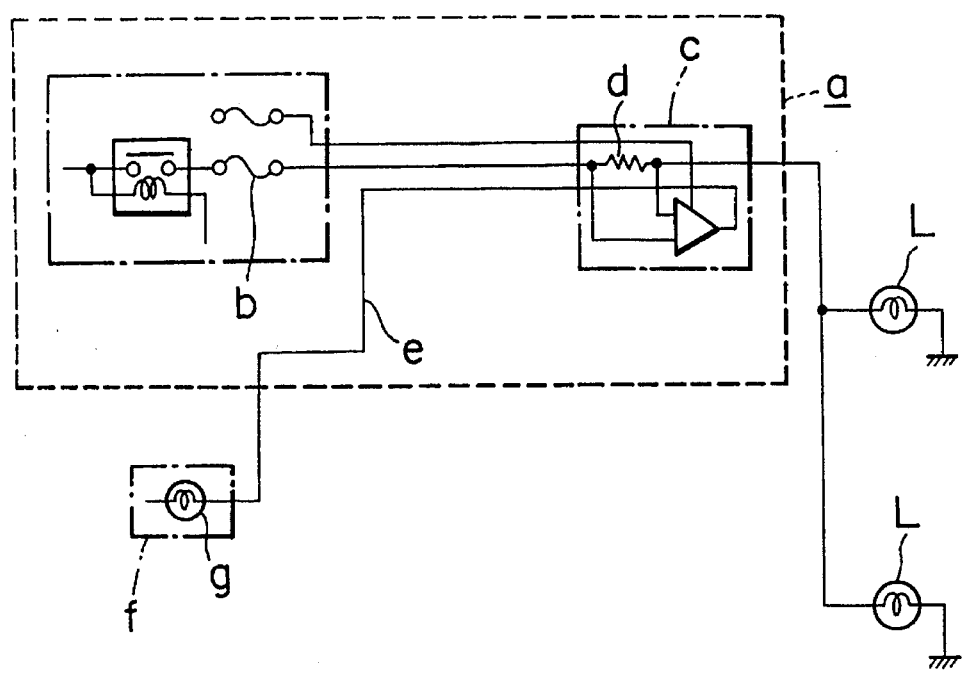
FIG. 12 is a schematic diagram showing an arrangement of a prior art wire-protecting apparatus for use with automobiles.
Figure 13:
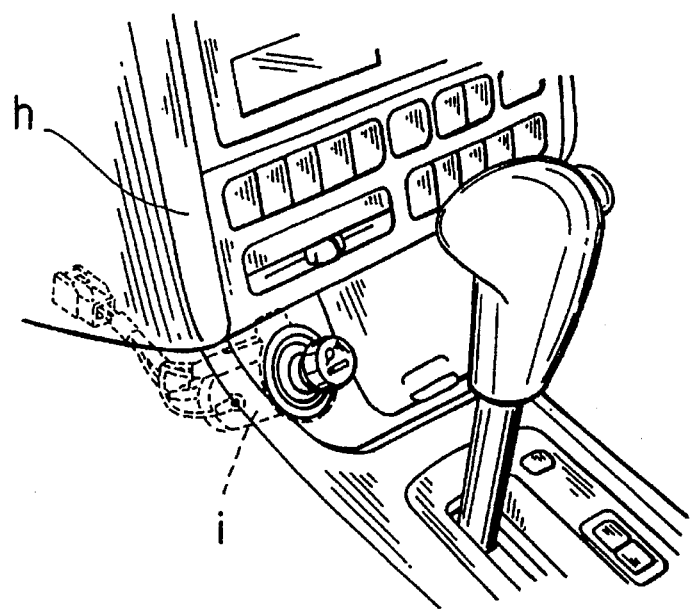
FIG. 13 is a perspective view of a cigarette lighter of a conventional car.

The door controlling relay circuit in FIG. 10 overcomes the deficiencies with the conventional door control relay circuit in FIG. 11. In the figure, the PTC 1 is incorporated as a protecting element in place of the fuse 17 and circuit breaker 18 in the system package 21. The PTC element 1 quickly responds to an overcurrent to shorten the time during which the overcurrent flows through the supply line 22, so that the power supply line 22 may be of a small diameter. Leads 23 in the system package 21 FIG. 10 may also be thinner allowing higher package density of the circuit. The use of the PTC element lends itself to miniaturization and lighter weight of the system package 21.

What is claimed is:

1. A wire-protecting apparatus for automobiles comprising:

at least one power-supplying lead for supplying an electric power to a load;

at least one PTC element inserted in series with said power-supplying lead, whereby said PTC element exhibits a high resistance at temperatures higher than a predetermined value when an overcurrent greater than a predetermined value flows through said load, thereby substantially shutting off the electric power to the load; and a display means for detecting an overcurrent flowing through said PTC element to display an occurrence of an abnormal condition of the load, wherein said display means comprises an LED connected in parallel with said PTC element.

2. The wire-protecting apparatus according to claim 1, wherein said load is a motor.

3. The wire-protecting apparatus according to claim 1, wherein said PTC element is constructed of high density polyethylene.

4. The wire-protecting apparatus according to claim 1, wherein said PTC element is constructed of polyvinylidene-fluoride.

* * * * *